(12) United States Patent
Hutner et al.

(10) Patent No.: US 6,757,766 B1
(45) Date of Patent: Jun. 29, 2004

(54) BUS SYSTEM FOR A HIGHLY SCALABLE MULTIPROCESSOR SYSTEM AND METHOD FOR TRANSMITTING INFORMATION IN THE BUS SYSTEM

(75) Inventors: Franz Hutner, Einsbach (DE); Pavel Peleska, Graefelfing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/449,434

(22) Filed: Nov. 24, 1999

(30) Foreign Application Priority Data

Nov. 24, 1998 (DE) .......................................... 198 54 178

(51) Int. Cl.[7] .................................................. G06F 1/00
(52) U.S. Cl. ........................ 710/107; 710/243; 712/28; 712/225
(58) Field of Search ................................ 710/104–105, 710/107, 110, 112, 113, 305, 309, 243, 241–242; 714/10, 11, 47, 48, 56, 43; 712/28, 31, 225, 3; 711/2, 5, 147, 148, 150, 152

(56) References Cited

U.S. PATENT DOCUMENTS

| | | | |
|---|---|---|---|
| 4,503,535 A | * | 3/1985 | Budde et al. .................. 714/11 |
| 5,421,002 A | * | 5/1995 | Lee et al. ...................... 714/12 |
| 5,666,551 A | * | 9/1997 | Fenwick et al. ............. 710/113 |
| 5,787,261 A | * | 7/1998 | Osaka et al. ................. 710/302 |
| 5,802,263 A | * | 9/1998 | Dittmar et al. ................ 714/11 |
| 6,076,129 A | * | 6/2000 | Fenwick et al. ............. 710/306 |
| 6,078,983 A | * | 6/2000 | Hanawa et al. ............. 710/240 |
| 6,178,466 B1 | * | 1/2001 | Gilbertson et al. ............ 710/3 |
| 6,240,479 B1 | * | 5/2001 | Snyder et al. .............. 710/113 |

* cited by examiner

Primary Examiner—Paul R. Myers
Assistant Examiner—Raymond N. Phan
(74) Attorney, Agent, or Firm—Morrison & Foerster LLP

(57) ABSTRACT

The invention relates to a bus for a highly scalable multiprocessor system, to a redundant bus system that utilizes this bus, and to a method for transmitting information in this bus system. To guarantee an optimally high throughput of individual accesses onto a shared memory, the bus 3 consists of an address bus 4 and a data bus 5, which are operated logically independent of one another and which are functionally connected only via a common identifier. In this way, the dynamic holding of the address bus 4 and of the data bus 5 as well as the latencies are minimized.

19 Claims, 7 Drawing Sheets

BUS SYSTEM FOR A HIGHLY SCALABLE MULTIPROCESSOR SYSTEM AND METHOD FOR TRANSMITTING INFORMATION IN THE BUS SYSTEM

BACKGROUND OF THE INVENTION

The invention relates to a bus for a highly scalable multiprocessor system and to a redundant bus system that uses this bus, as well as to a method for transmitting information in the redundant bus system.

FIG. 1 is a block illustration of a bus system known in the prior art. The bus 3 typically includes an address bus 4, a data bus 5 and a control bus 6. Connected to the bus 3 are several central units 2 and a memory storage device 1. Within the memory storage device 1 are submemories A and B. Several central units 2 maybe connected to the bus 3, such as central units A and B, for example, as shown in FIG. 1. The common bus 3 allows the central units access to the memory storage unit 1 and submemories A and B, in particular.

FIGS. 2A and 2B are a schematic illustration of a conventional read and write process in a conventional bus system as depicted in FIG. 1. FIG. 2A illustrates a read process. Typically, the respective memory addresses from an address register of a central unit 2 are first accessed, the address being increased after each transfer until the desired number data items is transmitted. Access of the memory addresses is accomplished via the address bus 4. Subsequently, control signals, for instance a request signal and read/write signals, are generated by the central unit 2. These control signals are transmitted to the memory 1 via the control bus 6. The central unit 2 then waits until the memory 1 sends back a ready flag via the control bus 6. Data can then be read from the memory 1 under the respective address.

FIG. 2B is a schematic illustration of writing into the memory 1. Writing functions in a manner similar to the above described read process.

FIG. 3 is a schematic illustration of a conventional command cycle. As illustrated in FIG. 3, a command cycle as processed in the bus system according to FIG. 1 consists of an address phase A1, a collect command phase B2 and an execute phase C3. In the conventional bus system an address is first delivered to the storage device 1 in the address phase A1. In the collect command phase B2, the storage device 1 allows the data word at the addressed memory space to be accessed. The data word can then be read and collected by the central unit 2 via the data bus 5. In the execute phase C3, data that have been read from the storage device 1 are processed.

The conventional bus structure described above has the disadvantage that for highly scalable multiprocessor systems, in particular, (i.e., bus systems comprising a flexibly expandable number of central units 2) the data transmission via the bus is insufficient since the plurality of central units causes a high number of bus accesses. Particularly in communication systems that require power to be adjustable up to approximately a power of ten due to the addition of processors, conventional bus systems with a unified bus lead to significant complications. It is also necessary that individual hardware errors must not lead to failure of the system. Thus a redundant system is required. However, such redundancy requirements necessitate an extraordinarily high wiring outlay with the conventional bus system, in addition to causing transit time problems and less flexible circuit arrangements. In order to guarantee compatibility with existing software, a large shared memory for all processors must be utilized. This shared memory must then be doubled in order to be available logically to accommodate errors in the memory system.

Typically, a conventional highly scalable multiprocessor system is realized with a spatially distributed bus system, wherein each processor is connected to both redundant memory halves A and B via specific bus subassemblies and cable lengths. Besides the previously mentioned transit time problems, development costs for the bus subassemblies is considerable, causing high production costs as well as an extraordinary space requirement in the stand or rack of the system.

FIG. 4 is a schematic illustration of a conventional bus with the address bus 4, the data bus 5 and the control bus 6. As depicted in FIG. 4, the address bus 4 consists of a plurality of address lines. Similarly, the data bus 5 can consist of a plurality of data lines that respectively comprise the width of one data word. As illustrated in FIG. 4, the control bus 6 consists of an access control line or arbitration line, as well as a command line and a line for transmitting a ready flag.

During a read cycle as illustrated in FIG. 4, an address is first applied at the address bus 4 during cycle 1 (i.e., from time t=0 to time t=1). During the subsequent cycle 2, the access rights are requested on the arbitration line and the read command is transmitted on the command line of the control bus 6. The central unit now waits for the ready flag of the memory 1 until it is indicated on the ready flag transmitting line of the control bus 6 during cycle 6, for example. The data can be subsequently read out via the data bus 5 during cycles 7 to 10.

A write cycle follows in a similar manner, also illustrated in FIG. 4. An address to be written is applied at the address bus 4 in cycle 11, whereupon access rights on the arbitration line and the write command are controlled via the control bus 6 during cycle 12. The ready flag then occurs relatively quickly, for instance in cycle 13. The data can then be written into the memory 1 via the data bus 5 during cycles 14 to 16. However, as illustrated in FIG. 4, the holding time of the bus is extraordinarily high due to the long wait times. This leads to considerable problems particularly when, instead of the customary "burst" accesses in which block transfers occur via the bus, individual accesses are carried out, as is the rule in communication systems, for example. Thus, given a plurality of individual accesses, high bus holding times arise in the prior art, though only a small volume of data is transmitted.

SUMMARY OF THE INVENTION

Therefore, a need exists to create a bus for a highly scalable multiprocessor system, a redundant bus system that uses this bus, and a method for transmitting information on such a bus system, wherein the bus holding times and latencies are reduced and a simple and cost-effective hardware realization is possible.

The above needs are met by the present invention which features a bus and bus system including an address bus having at least one address access control line and at least one address identifier line. Further, a data bus is included that has at least one data bus access control line and at least one data identifier line. The at least one address and data access control lines control the right to access the address and data buses. In addition, the at least one address and data identifier line transmit an identifier that enables allocation of address information to pertinent data information. The featured bus may also be included in a bus system having two or more of the featured buses, thereby creating a redundant bus system.

In particular, the use of a chronologically divided address and data bus that respectively comprise access control lines and identifier lines, wherein the identifier lines transmit an identifier for the allocation of the address information to the data information, results in a bus that can perform data transfers chronologically independent of address requests and, thus, sharply reduce the bus holding times particularly during individual accessing of the bus.

The divided address and data bus preferably has check sum lines for transmitting a check sum of the signals transmitted on the bus, as well as acknowledgment lines for transmitting an acknowledgment signal corresponding to a signal for comparing the signals that are transmitted via the respective bus to the check sum. A secure transmission is thus obtained on each bus.

The address bus additionally comprises command lines for transmitting a command, which is preferably a write or read command for a memory.

The identifier, which is necessary in order to allocate the information that has been respectively transmitted on the address bus or data bus, preferably consists of a number of a respective bus subscriber and of a serial transaction number. A bus subscriber can thus transmit several commands in succession and later unambiguously allocate arbitrarily arriving responses.

A bus system preferably consists of the above described bus and a plurality of active and passive subscribers. The passive bus subscribers are a matter of memory units, while the active bus subscribers represent central units or CPU's. Given the arrangement of a respective central unit and an appertaining memory unit on one plug-in-type motherboard, an extremely flexible hardware realization is obtained wherein the bus can be arranged in a space-efficient manner in the rear panel of a rack. By allocating a respective address space for each bus subscriber and by using an acknowledging signal generator, transmission of information on the address bus and data bus can occur mutually independently and very rapidly.

Each bus subscriber preferably has an output device and job storage device in which the jobs to be sent are stored until reception of a corresponding positive acknowledging signal. In like manner, each bus subscriber can comprise an input job storage device in which a predetermined number of received jobs are stored. Given mistransmission of data, it is possible to resend the data easily while a plurality of jobs can be accepted and stored by the input job memory independent of the processing time of the respective bus subscriber. This further reduces the bus holding times. To modify an overload of the input job memory, a negative acknowledging signal is output as soon as the maximum number of jobs is received.

A redundant bus system preferably consists of at least two of the above described bus systems, whereby an error detector detects an error in one of the bus systems and switches over to the other bus system given the presence of this error. The error detector can be realized by the acknowledging signal generator. As a result, the overall operativeness of the system is not jeopardized even given the failure of a bus system, which is why the bus system satisfies extremely high reliability requirements.

Additional advantages and novel features of the invention will be set forth in part in the description which follows, and in part will become apparent to those skilled in the art upon examination of the following, or may be learned by practice of the invention. The advantages of the invention may be realized and obtained by means of the instrumentalities and combinations particularly pointed out in the appended claims.

BRIEF DESCRIPTION OF THE DRAWINGS

The invention is detailed below with the aid of exemplifying embodiments with reference to the attached drawings.

DETAILED DESCRIPTION OF THE PREFERRED EMBODIMENTS

Figure 1:
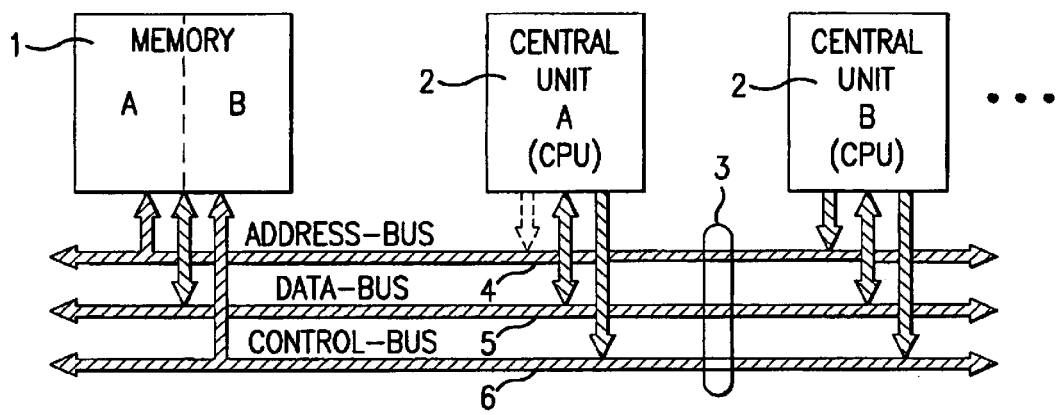
FIG. 1 is a block diagram of a bus system known in the prior art.
Figure 2A:
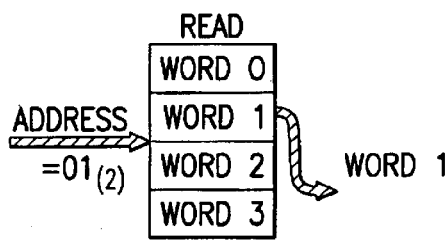
FIGS. 2A and 2B are schematic illustrations for a read process and a write process known in the prior art.
Figure 2B:
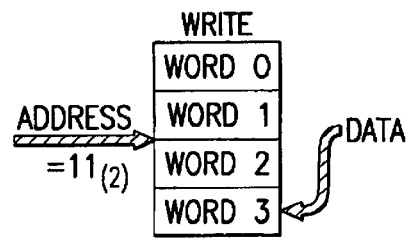
Figure 3:
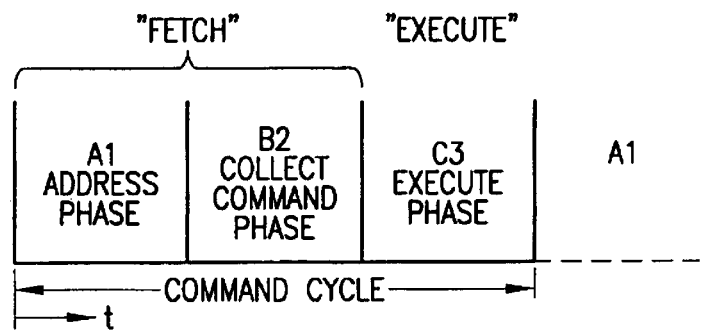
FIG. 3 is a time diagram for executing a cycle known in the prior art.
Figure 4:
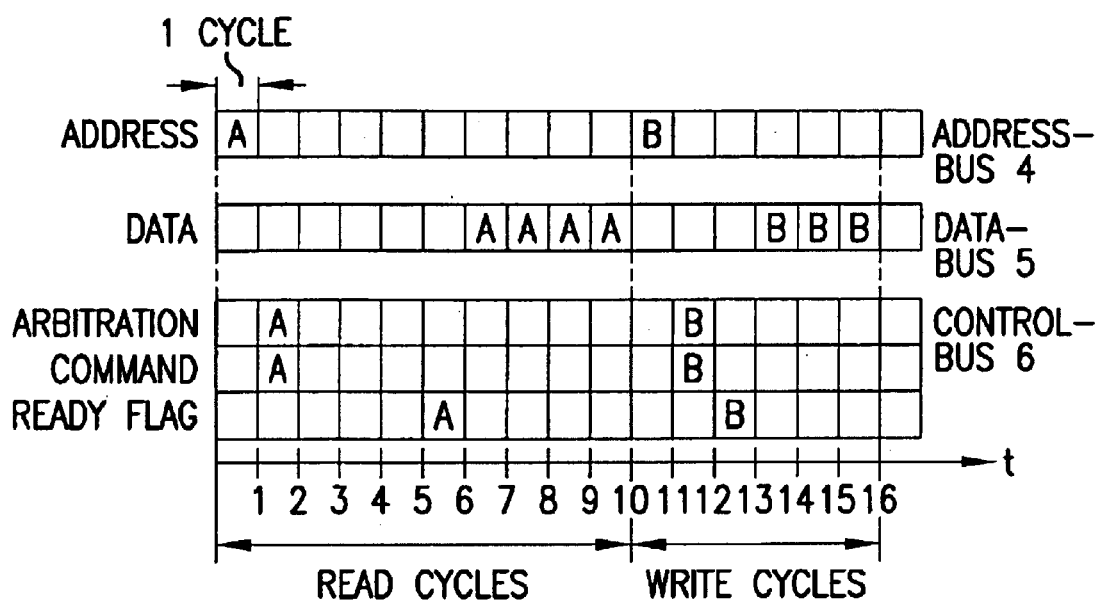
FIG. 4 is a detailed time diagram of the transmitted data on a bus known in the prior art.
Figure 5:
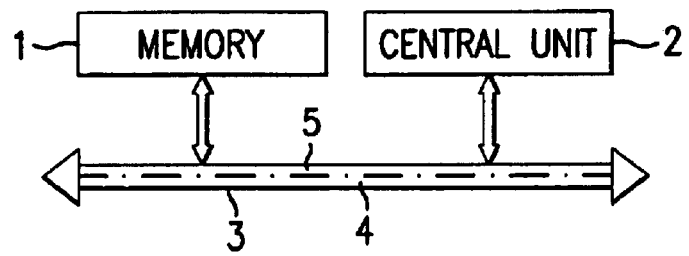
FIG. 5 is a block diagram of a bus system according to a first embodiment of the present invention.

FIG. 5 illustrates a bus system according to an embodiment of the present invention. The reference character 1 references a memory; 2 references a central unit, such as a CPU; and 3 references a shared bus. The shared bus 3 consists of an address bus 4 and a data bus 5, which affords a chronologically separate transmission of information. The address bus 4 is operated logically independent of the data bus 5. To accomplish this independent operation, each bus subscriber (for instance the central unit 2 or the memory 1) must apply for the respective access right prior to using the address bus 4 or the data bus 5. Thus, there are separate arbitration processes for addresses and data in bus 3. In contrast to the conventional busses, a very high throughput of individual accesses to the shared memory 1 is obtained by this new type of bus, and is optimal for communication systems or communication computers, in particular. The conventional "burst" accesses or block transfers of data do not occur in communication systems.

Figure 6:
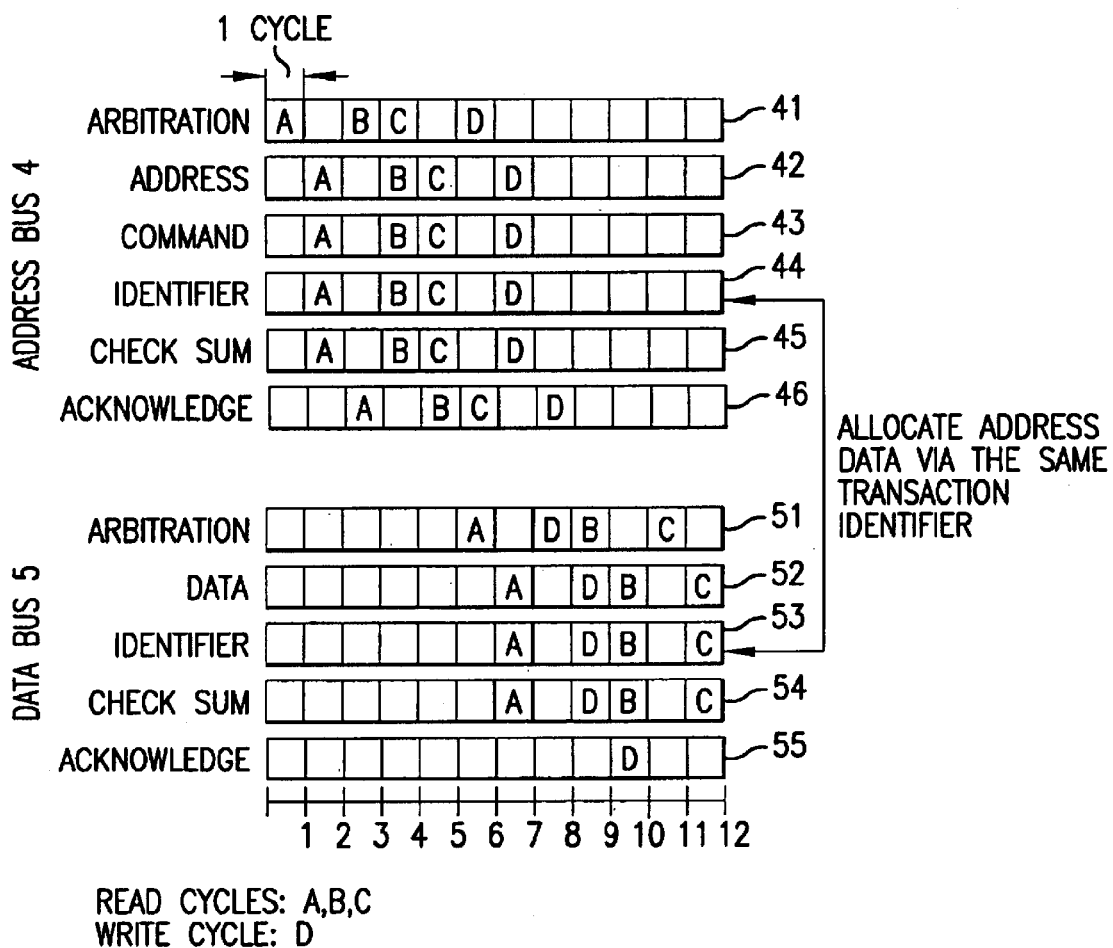
FIG. 6 is a detailed illustration of the transmitted data on the bus as shown in FIG. 5.

FIG. 6 is a detailed time diagram of the signals in bus 3, comprised of the address bus 4 and the data bus 5, more particularly. Address access control line 41 controls or arbitrates the right to access the address bus 4. Address line 42 references a plurality of address lines via which a respective address can be transmitted in parallel fashion. Command line 43 for transmits a command in the address bus 4, typically a write or read command to the shared memory. However, the commands on the command lines are not limited to just read or write commands. Rather, they can also comprise other commands for transmitting data between central units, memories, input/output units, and so forth. Address identifier line 44 is used for transmitting an identifier. In particular, this identifier serves to allocate between the information that is transmitted in the address bus 4 and the information that is transmitted in the data bus 5, as will be detailed later. Address check sum line 45 transmits a check sum with which the information that is transmitted on the address bus 4 can be checked for a transmission error. Acknowledging line 46 transmits a positive acknowledging signal upon a successful check sum test.

Data access line 51 takes over control arbitration of the right to access the data bus. A plurality of data lines 52 are used to transmit data in parallel and simultaneously. Data identification line 53 transmits a transaction identifier that is identical to the address bus 4 for purposes of allocating the information transmitted on bus 3 between the address bus 4 and the data bus 5. Data check sum line 54 transmits a check sum with which it is possible to perform an error check for the signals transmitted on the data bus 5. Data acknowledging line 55 transmits a positive acknowledgment signal when errors have not occurred on the data bus 5.

The allocation between the addresses transmitted on the address line 42 and the data transmitted on the data lines 52 occurs with the aid of the identifiers transmitted on the identifier lines 44 and 53. These transaction identifiers consist of the number of the subscriber and a transaction number, for example. Since the number of active transactions per bus subscriber is limited, a relatively small number of bits (e.g., 8) suffices for the identification.

When a bus subscriber starts a transaction (e.g., read or write) on the bus 3, the subscriber first applies for the right to operate the address bus 4. Prior to a grant of the right to operate by an access control device, the bus subscriber (e.g., the central unit 2) simultaneously sends out in parallel a command via the command line 43, an address via the address lines 42, an identifier via the address identification line 44, and a check sum over all these signals via the address check sum lines 45 during cycle 2 as shown in FIG. 6. In the next bus cycle 3, all bus subscribers connected to bus 3 accept this information. The accepted information is first checked for correct check sums and is not used any further if errors are present. A positive acknowledgment signal is not transmitted in this case.

If there are no errors present, the address that has been transmitted via the address lines 42 is compared to a separate address space that is allocated to each bus subscriber 1 and 2. If the address that has been transmitted agrees with the address space, the bus subscriber is addressed and performs the desired transaction job according to the command sent on the command line 43. Otherwise, the address is rejected. The addressed bus subscriber confirms the address at a definite time interval from the address transmission by means of an address acknowledging signal, which is transmitted on the address acknowledging lines 46 during bus cycle 3, as illustrated in FIG. 6.

At its bus input, each bus subscriber has an input job memory or a queue for jobs in which a specific number of jobs can be stored. In this way, address jobs or data jobs that are transmitted in rapid succession can be accepted without wait times and processed at a later time. When this input job memory is full at a bus subscriber, this addressed receiving bus subscriber sends a negative acknowledgment signal in response to additional jobs until there is enough free space in the input job memory again.

The transmitting bus subscriber notes all transmitted address cycles at least until receiving a positive acknowledgment signal. A negatively acknowledged transaction can thus be repeated by the transmitting bus subscriber after a few cycles. The transaction is repeated until a positive acknowledgment signal is received by the bus subscriber.

When a read cycle has been requested, as represented in FIG. 6 by the characters A, B and C, the bus subscriber selected by the address performs the read cycle in the memory part that is realized there. The data that have been read are then sent back to the transmitting bus subscriber via the data bus 5 after a time delay (for the read cycle A, cycles 5 and 6). For this purpose, the memory 1 applies for access of the data bus 5 at the access control. Once the data bus 5 has been granted, the memory 1 transmits the data that have been read out via the data lines 52, transmits the transaction identifier received in the addressing process via the data identifier line 53, and transmits a check sum over all data bus signals on the data check sum line 54 are during bus cycle 7 as shown in FIG. 6. This transmission takes place in parallel fashion and simultaneously. The user of the read cycle (i.e., central unit 2) recognizes from the transaction identifier that the data have been requested and retrieves the data, accordingly. After the data are checked for errors, the data are sorted according to a serial transaction number that is part of the identifier and are retrieved from the central unit 2 in ascending order by transaction number. The transaction number in this bus subscriber (central unit 2) can then be used again for new jobs.

In write cycles via the bus 3, as represented in FIG. 6 by the character D, after receiving the positive acknowledgment signal in the address acknowledging line 46 and after applying for rights to access the data bus 5, the user (i.e., central unit 2) sends the data having the same transaction identifier as in the address via the data line 52. At the same time, a data check sum over all data bus signals is transmitted on the data check sum line 54. The addressed bus subscriber (i.e., memory 1) allocates the received data to the address already received via the address lines 42 with the aid of the identical transaction identifier. The receiving bus subscriber (memory 1) compares the check sum of these data to the check sum that was transmitted on the data check sum lines 54 and checks the transaction identifier. When there are no errors the execution of the write cycle D is confirmed at a fixed time interval from the data transmission (bus cycle 10 according to FIG. 6), by a data acknowledging signal that is transmitted on the data acknowledge signal line 55. The user (central unit 2) can then use the transaction number again and reject its information pertaining to this bus cycle. On the other hand, if an error is detected, the data are negatively acknowledged a positive data acknowledgment signal is not emitted on the data acknowledge signal line 55 and the user (central unit 2) repeats the entire write cycle D upon receiving another right of access onto the bus 3.

The coordinating or controlling of access onto the address bus 4 and the data bus 5 (i.e., arbitration) occurs so as to overlap in time with usage cycles. With each cycle, a new granting can be made in a following cycle. In this way, it is possible to use both the address bus 4 and the data bus 5 in each bus cycle independent of a respective new bus subscriber. The bandwidth of the bus is thus not reduced by the arbitration. The arbitration time only enters into the transit time of an individual access. A corresponding arbiter access control can be realized centrally (once per bus system) or in multiple respective bus subscribers.

In the bus system illustrated in FIG. 5, the dynamic holding is minimized reduced by the write and read cycles, since both the address bus 4 and the data bus 5 are respectively occupied exactly one cycle only in the reading and writing processes. In this way, given a frequency f, a maximum of f write or read cycles A, B, C or D per second can be transmitted via such a bus.

Figure 7:
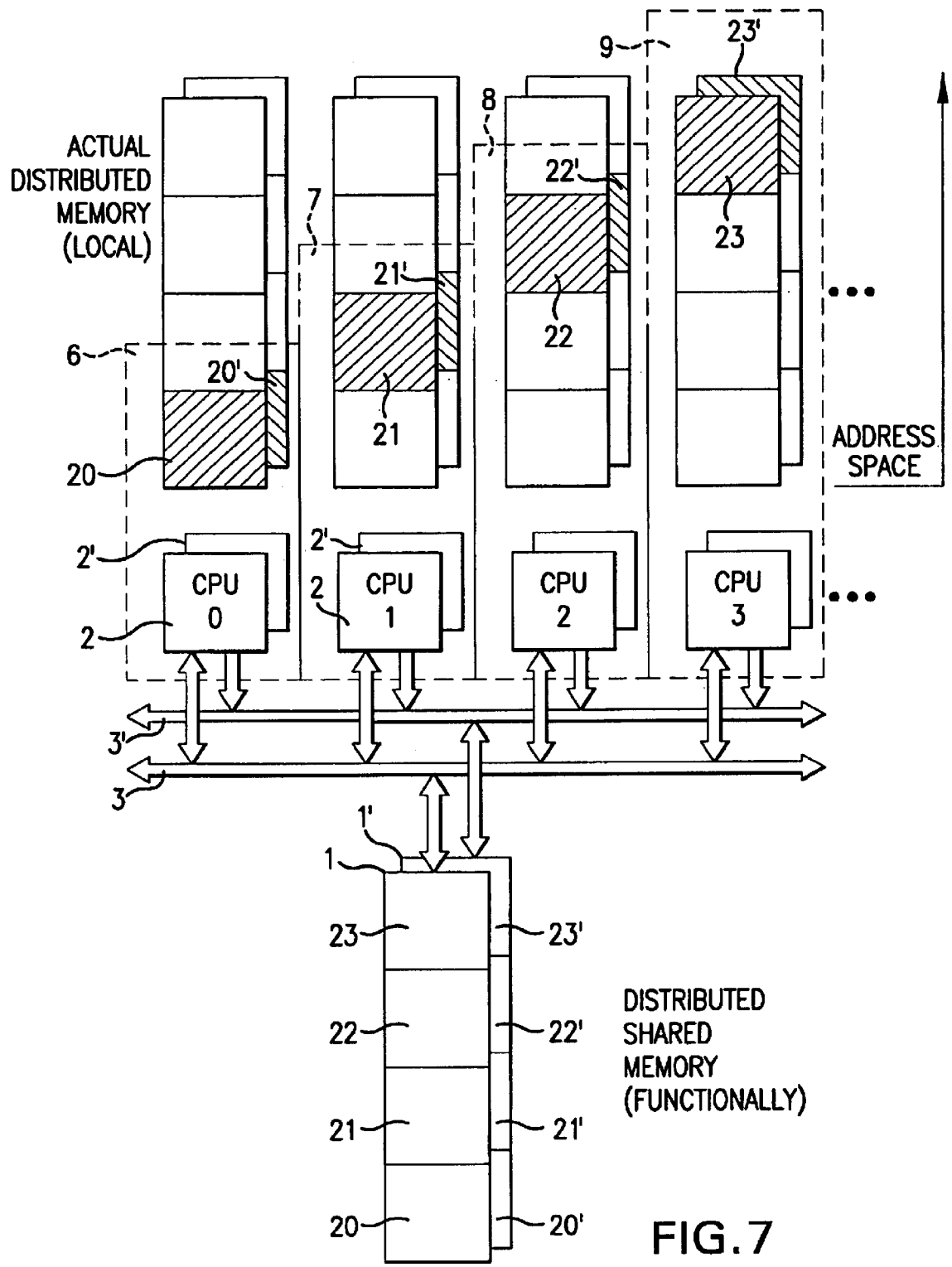
FIG. 7 illustrates a redundant bus system according to a second embodiment of the present invention.

FIG. 7 is a block diagram of a redundant bus system that makes use of the bus as illustrated in FIG. 6. The redundant bus system as illustrated in FIG. 7 differs from the bus system illustrated in FIG. 5 only in that the central unit 2 consists of a plurality of central units 2, wherein it is possible to increase the computing power of the system. Similarly, the storage device 1 does not consist of a shared memory, but is realized by a distributed shared memory that is only functionally connected to the bus 3 like a shared memory. At the top of FIG. 7, the actual distribution of the storage devices is illustrated, wherein storage units 20, 21, 22 and 23 are respectively allocated to each central unit. Advantageously, the central unit 2 and the respective storage units 20, 21, 22 and 23 are situated on a plug-in-type motherboard and can be connected modularly to the above described bus 3. The bus 3 is preferably located in the rear panel of a rack, wherein the transit times can be further reduced compared to hardware realizations found in the prior art. The reference characters 6,7,8 and 9 reference such plug-in-type motherboards on which a central unit 2 and storage units 20, 21, 22 and 23 are respectively located. Based on the identical construction of these plug-in-type boards 6,7,8 and 9, the production is simple and economical.

Beyond this, this type of modularly constructed system has the advantage that it can be expanded in a wide range with respect to its processor power, the storage capacity rising equivalently with the processor power. This is a further advantage over the prior art, where the storage device 1 was previously realized on a plug-in-type board separate from the processors as a shared memory.

Functionally, the plurality of storage units 20, 21, 22, and 23 behave in the same manner as a shared memory as found in the prior art, since the respective memory units are assigned respective matching address spaces prior to installation in the bus system, as shown in FIG. 7.

As illustrated in FIG. 7, a redundant bus system is created by repeating the bus system using another bus system consisting of a bus 3', central units 2' and a storage device 1'. The storage device 1' consists of the storage units 20', 21', 22' and 23'. The reserve bus system 1', 2' and 3' is constructed identically to the main bus system 1, 2, and 3 and serves as reserve bus system in case an error occurs on the main bus system.

For example, given the emergence of a negative address or data acknowledgment signal, the bus 3 can be switched over onto the reserve bus 3'. By the same token, given a failure of central unit 2, it is possible to replace this with a central unit 2', or to compensate the failure of a storage units 20, 21, 22 and 23 by means of the reserve storage units 20', 21', 22' and 23'.

After a changeover onto the reserve bus 3', all transactions that have not been completed are started again. In this way, a failure of one of the redundant buses 3 and 3' cannot be detected by the rest of the system. Beyond this, the complete function and all relocated bus cycles are maintained in their entirety.

FIG. 7 presumes two reflected bus systems; however, three or more bus systems can also be used as redundant systems. Beyond this, it is possible to create variations with respect to a doubling, tripling, and so on of the central units, though only two redundant central units 2 and 2' are used in FIG. 7. Similarly, the storage units 20, 21, 22 and 23 can also be multiplied.

A method for transmitting information in a redundant bus system as illustrated in FIG. 7 is described below.

Figure 8:
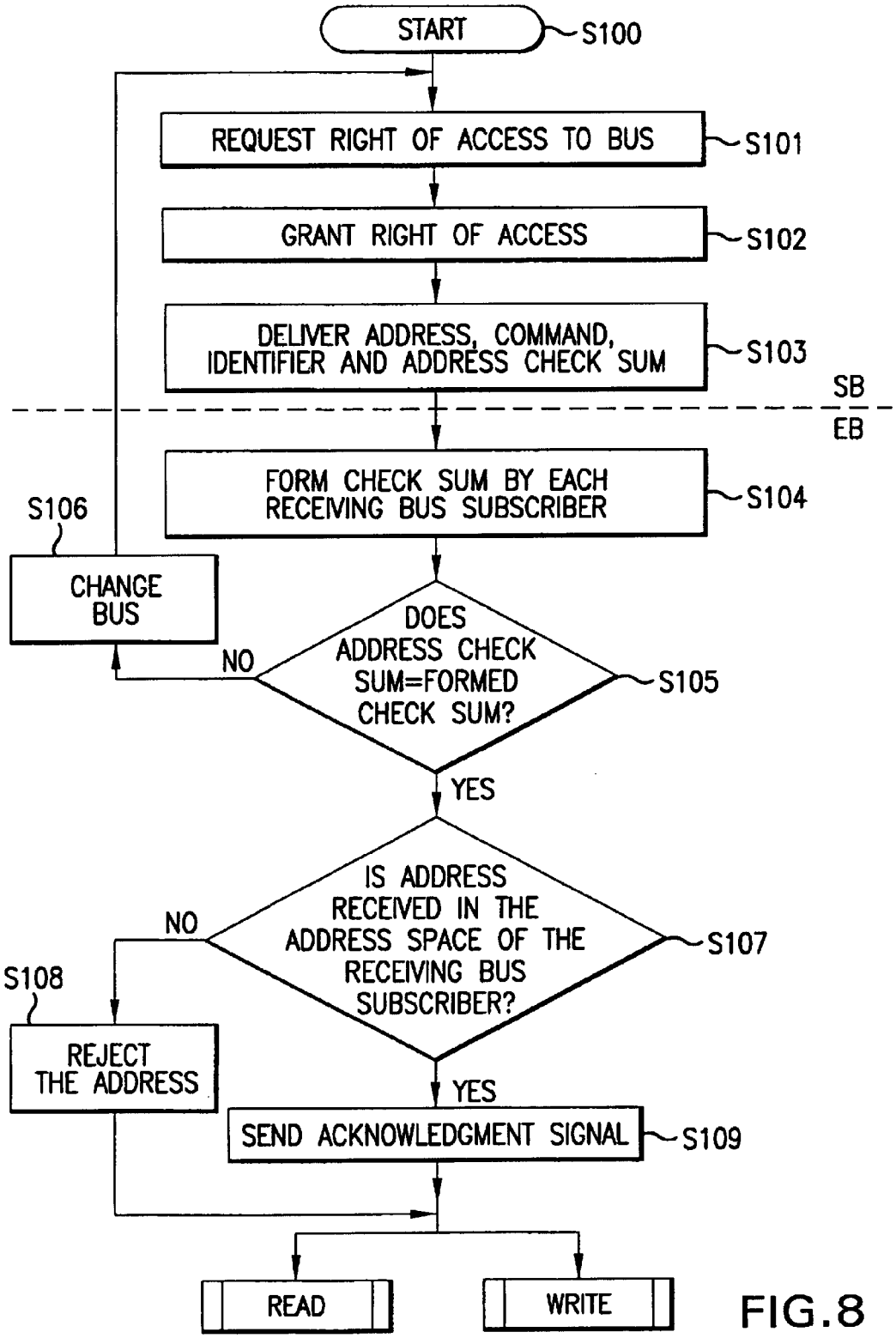
FIG. 8 is a flowchart illustrating the steps for transmitting information on the redundant bus system as shown in FIG. 7.

FIG. 8 is a flowchart illustrating the steps taken in the method for transmitting information. First, in step S101 a transmitting bus subscriber requests the right to access the bus 3, for example. The access control then grants the right of access to the transmitting bus subscriber in step S102. The granting of the rights of access can be given in a prioritized manner or in an arbitrary order. In step S103, the transmitting bus subscriber delivers an address, a command, an identifier and the check sum of all these signals via the address bus 4. The receiving subscribers that are connected at the bus 3 receive this information that has been delivered via the address bus 4 and form a check sum, respectively (step S104).

In step S105, the formed check sum is compared to the address check sum, which is transmitted via the address bus, in each receiving bus subscriber. If the two sums do not match a negative acknowledgment is delivered and a change of buses occurs in subsequent step S106. If the comparison result obtained in step S105 is positive, indicating that the check sum formed in the receiving bus subscriber corresponds to the transmitted address check sum, then the received address is compared to the respective address space of the receiving bus subscriber in step S107. If the received address does not lie in the address space of the respective receiving bus subscriber, then the address is rejected and the process ended as indicated in step S108. On the other hand, if the received address does lie in the address space assigned to the receiving bus subscriber, then this receiving subscriber delivers a positive acknowledgment signal in step S109. As mentioned previously, the job can be filed in a queue, for example.

Figure 9:
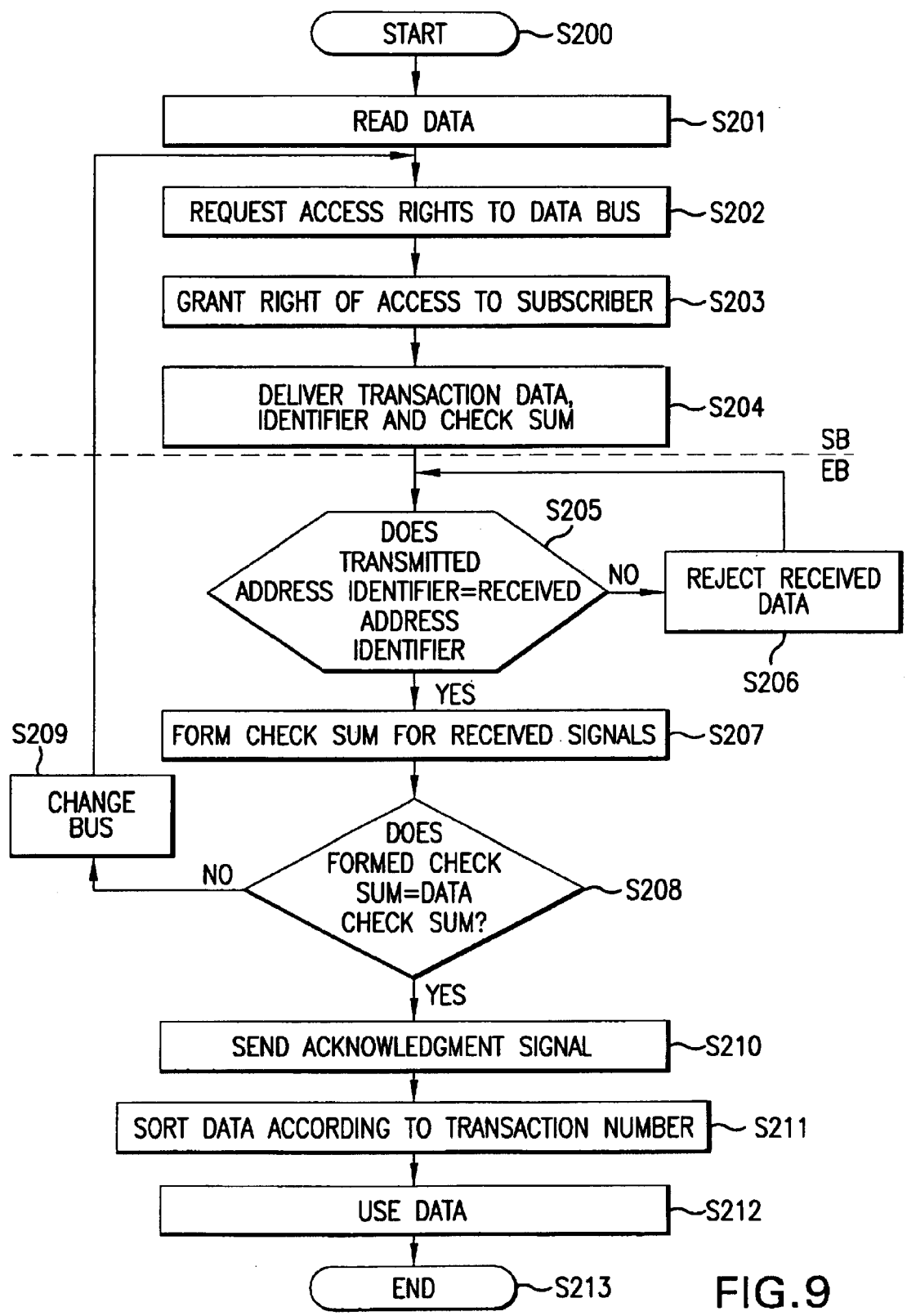
FIG. 9 is a flowchart illustrating the steps for a read process in the redundant bus system as shown in FIG. 7.

FIG. 9 is a flowchart illustrating a read process in the redundant bus system depicted in FIG. 7.

If, for example, the job that is written into the queue corresponds to a data read, then a data read in the memory device 1 is executed in step S201. The receiving bus subscriber (memory device 1) subsequently applies for access rights at the data bus 5. Then in step S203, the arbitration or the access control is accomplished by the access control means, wherein the receiving subscriber receives a grant of the right to access the data bus 5. In step S204 the receiving bus subscriber delivers to the data bus as transaction data the memory data that have been read out, as well as the identifier that pertains to the address-job and the check sum over all signals. In step S205 the data identifier received at the data bus 5 is compared in the transmitting bus subscriber (central unit 2) to the transmitted address identifier. If the comparison result is negative, the data received at the data bus 5 are rejected in step S206. The remaining received data identifiers are then compared to the transmitted address identifiers. If the comparison result obtained in step S205 is positive, that is, if the received data identifier corresponds to the transmitted address identifier, then the transmitting bus subscriber forms the check sum over all signals received at the data bus 5 as shown in step S207. In step S208 the obtained check sum is compared to the data check sum that has been transmitted at the data bus 5. If the result is negative, the bus is switched in step S209, since it must be assumed that the bus has an error. Finally, the receiving bus subscriber reapplies for access rights in step S202.

If the result of the comparison in step S208 is positive, that is, if the check sum formed in step S207 is the same as the data check sum, then the transmitting bus subscriber delivers a positive acknowledgment signal in step S210. In step S211 the received data are sorted according to transaction number, and in step S212 they are further processed and used by the central unit.

Figure 10:
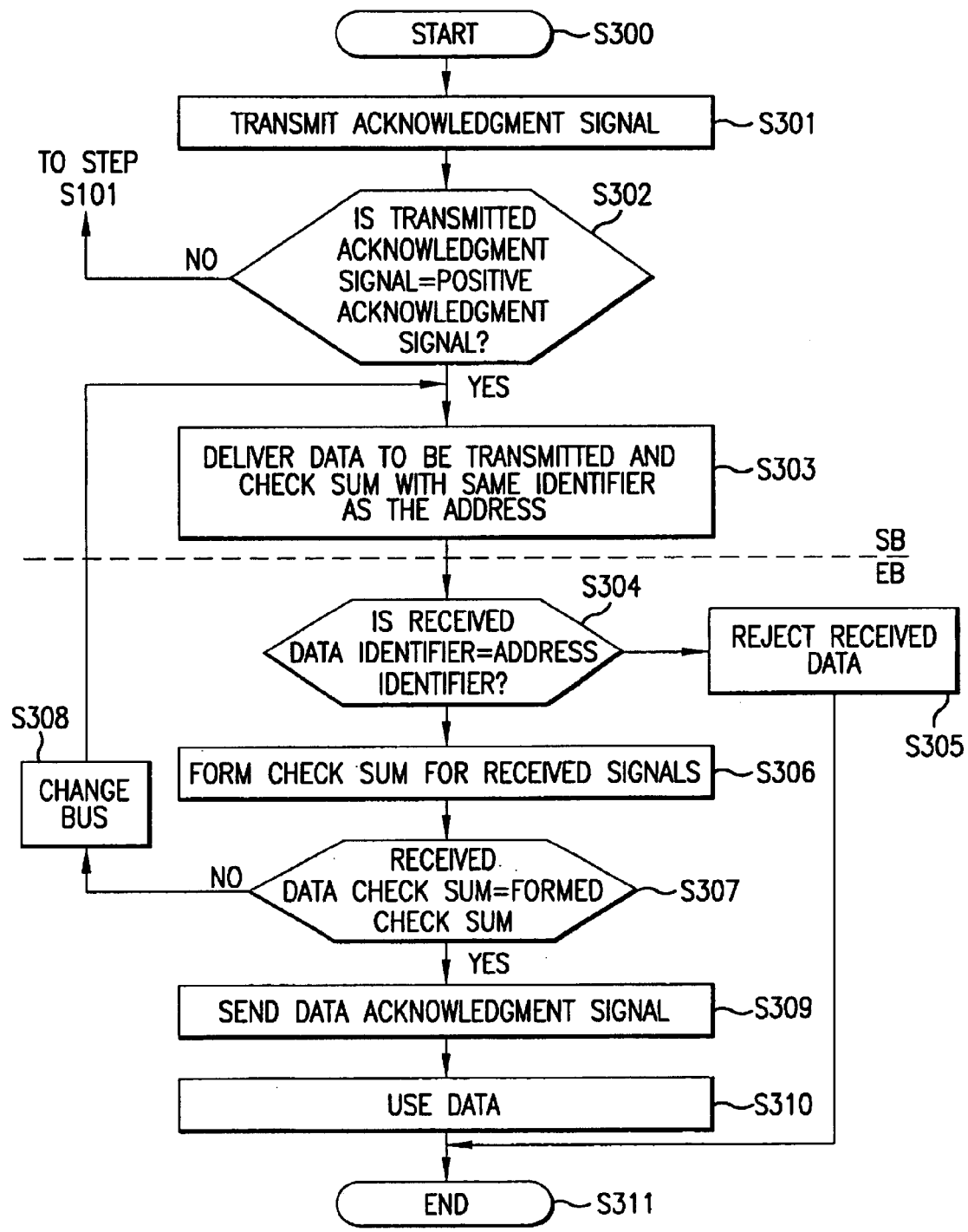
FIG. 10 is a flowchart illustrating the steps for a write process in the redundant bus system as shown in FIG. 7.

FIG. 10 is a flowchart illustrating a write process in the redundant bus system depicted in FIG. 7. In cases where the command, in the address job was a write command, the acknowledgment signal transmitted by the receiving bus subscriber (S109) is received as shown in step S301. In step S302 the transmitting bus subscriber (central unit 2) compares the received acknowledgment signal to a positive acknowledging signal, and if the comparison is negative, a reapplying occurs in step S101 (shown in FIG. 8). In cases where the comparison result in step S302 is positive, that is, the received acknowledging signal is a positive acknowledging signal, during the next bus cycle on the data bus 5 the transmitting bus subscriber delivers the data that are to be transmitted to the data bus 5, as well as the same identifier as in the address job in connection with the check sum over all signals as shown in step S303.

In step S304 the receiving bus subscriber compares the received data identifier to the address identifier that has already been sent. If the comparison result is negative, the signals pending at the data bus 5 are rejected in step S305. If, on the other hand, the result of the comparison in step S304 is positive, that is, the received data identifier corresponds to the address identifier already sent, then the check sum over the received signals is formed at step S306. In step S307 a comparison is performed between the obtained data check sum and the received data check sum. If the result of the comparison is a negative result, the bus is changed at step S308, since it must be assumed that there is a defective bus. The delivering of the data job by the transmitting bus subscriber is then performed again in step S303. If, on the other hand, there is a positive comparison result, that is, the data check sum agrees with the received data check sum, then a data acknowledging signal is delivered in step S309 by the receiving bus subscriber via the data bus 5. The data are subsequently written in the receiving bus subscriber (memory 1) in step S310.

The present invention relates particularly to the use in communication systems of telecommunication. But the invention can be used in all other multiprocessor systems in which individual accesses onto a shared bus are preferably performed.

While this invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A bus for a scalable multi-processor system comprising:
    an address bus for transmitting address information on a plurality of address lines, the address bus including at least one address access control line and at least one address identifier line; and
    a data bus for transmitting data information on at least one data line, the data bus including at least one data bus access control line and at least one data identifier line; wherein
    the at least one address access control line and the at least one data bus access control line respectively control a right to access the address bus and the data bus; and the at least one address identifier line and the at least one data identifier line respectively transmit an identifier configured to allocate address information to corresponding data information,
    the bus is configured to be connected within a bus system to a plurality of active bus subscribers and a plurality of passive bus subscribers, and
    each of the plurality of passive and active bus subscribers has a corresponding acknowledgment signal generator for the address bus and the data, bus that generates a check sum from respective signals pending at the address bus and the data bus, compares the check sum to the correspondingly transmitted address and data check sum, and delivers a positive address and data acknowledgment signal to the at least one address and data acknowledgment signal line of the respective address and data bus when the check sum matches the address and data check sum.

2. The bus according to claim 1, wherein the address bus further comprises at least one address check sum line configured to transmit an address check sum of signals transmitted on the address bus and at least one address acknowledgment line configured to transmit an address acknowledgment signal and wherein the address acknowledgment signal corresponds to a signal for comparing the signals transmitted on the address bus to the address check sum.

3. The bus according to claim 1, wherein the data bus further comprises at least one data check sum line configured to transmit a data check sum of the signals transmitted on the data bus and at least one data acknowledgment line configured to transmit a data acknowledgment signal and wherein the data acknowledgment signal corresponds to a signal for comparing the signals that are transmitted on the data bus to the data check sum.

4. The bus according to claim 1, wherein the address bus includes at least one command line for transmitting a command signal.

5. The bus according to claim 4, wherein the command signal is one of a write and read command to a memory connected to the bus.

6. The bus according to claim 1, wherein the address identifier and the data identifier are comprised of a number of a bus subscriber and a serial transaction number.

7. The bus according to claim 1, wherein the plurality of passive bus subscribers are comprised of memory storage units and the plurality of active bus subscribers are comprised of central units.

8. The bus system according to claim 1, wherein each bus of the plurality of active and passive bus subscribers for address and data bus comprises a corresponding output and job storage device in which jobs to be transmitted are stored until a pertinent positive address or data acknowledgment signal is received.

9. A bus system for a scalable multi-processor arrangements comprising:
    a bus having an address bus for transmitting address information on a plurality of address lines, the address bus including at least one address access control line and at least one address identifier line, and a data bus for transmitting data information on at least one data line, the data bus including at least one data bus access control line and at least one data identifier line;
    a plurality of active bus subscribers connected to the bus, and a plurality of passive bus subscribers connected to the bus;
    wherein the at least one address access control line and the at least one data bus access control line respectively control a right to access the address bus and the data bus; and
    the at least one address identifier line and the at least one data identifier line respectively transmit an identifier configured to allocate address information to corresponding data information wherein each of the plurality of active and passive bus subscribers on the address and data bus comprises a corresponding input job storage device in which a maximum number of received jobs are stored.

10. The bus system according to claim 9, wherein the plurality of passive bus subscribers are comprised of memory storage units and the plurality of active bus subscribers are comprised of central units.

11. The bus system according to claim 9, wherein a separate address space is allocated to each of the plurality of passive and active bus subscribers and each bus subscriber has an address comparator for activating the corresponding bus subscriber, and wherein the address comparator compares an address pending on the bus to the corresponding separate address space.

12. The bus system according to claim 9, wherein the corresponding input job storage device delivers a negative acknowledgment signal onto at least one of the at least one address and the at least one data acknowledgment line when the number of jobs received exceeds a maximum number of jobs to be stored.

13. A bus system for a scalable multi-processor arrangement, comprising:
a bus having an address bus for transmitting address information on a plurality of address lines, the address bus including at least one address access control line and at least one address identifier line, and a data bus for transmitting data information on at least one data line, the data bus including at least one data bus access control line and at least one data identifier line;
a plurality of active bus subscribers connected to the bus; and a plurality of passive bus subscribers connected to the bus;
wherein the at least one address access control line and the at least one data bus access control line respectively control a right to access the address bus and the data bus;
the at least one address identifier line and the at least one data identifier line respectively transmit an identifier configured to allocate address information to corresponding data information; and
an access control within each of the plurality of passive and active bus subscribers configured to control corresponding access of each bus subscriber onto the address and data bus such that chronological overlapping use of the address and data bus is enabled.

14. A redundant bus system, comprising:
at least two bus systems each having an address bus for transmitting address information on a plurality of address lines, the address bus including at least one address access control line and at least one address identifier line, and a data bus for transmitting data information on at least one data line, the data bus including at least one data bus access control line and at least one data identifier line;
a plurality of active bus subscribers connected to the at least two bus systems;
a plurality of passive bus subscribers connected to the at least two bus systems; and
an error detector configured for detecting an error by one of the at least two bus systems and switching from one bus systems to another bus system when an error is detected, wherein the at least one address access control line and the at least one data bus access control line respectively control a right to access the address bus and the data bus; and the at least one address identifier line and the at least one data identifier line respectively transmit an identifier configured to allocate address information to corresponding data information, and each of the plurality of passive and active bus subscribers has a corresponding acknowledgment signal generator for the address bus and the data bus that generates a check sum from respective signals pending at the address bus, and the data bus compares the check sum to the correspondingly transmitted address and data check sum, and delivers a positive address and data acknowledgment signal to the at least one address and data acknowledgment signal line of the respective address and data bus when the check sum matches the address and data check sum.

15. The redundant bus system according to claim 14, wherein the error detector is comprised of the corresponding acknowledgment signal generator.

16. A redundant bus system, comprising:
at least two bus systems each having an address bus for transmitting address information on a plurality of address lines, the address bus including at least one address access control line and at least one address identifier line, and a data bus for transmitting data information on at least one data line, the data bus including at least one data bus access control line and at least one data identifier line;
a plurality of active bus subscribers connected to the at least two bus systems;
a plurality of passive bus subscribers connected to the at least two bus systems; and
an error detector configured for detecting an error by one of the at least two bus systems and switching from one bus systems to another bus system when an error is detected, wherein
the at least one address access control line and the at least one data bus access control line respectively control a right to access the address bus and the data bus; and the at least one address identifier line and the at least one data identifier line respectively transmit an identifier configured to allocate address information to corresponding data information, and
the plurality of passive bus subscribers and the plurality of active bus subscribers are formed on a plug-in type board and each bus system is located in a rear panel of a rack.

17. A method for transmitting information in a redundant bus system having a plurality of main bus subscribers, a plurality of reserve bus subscribers, a main bus with a main address bus and a main data bus and a reserve bus with a reserve address and a reserve data bus, comprising:
requesting a transaction by applying for a right to access the main address bus by a transmitting bus subscriber;
granting the right to access the main address bus to the transmitting bus subscriber; outputting an address job by the transmitting bus subscriber, the address job having a command, a transmitted identifier and a check sum, wherein the check sum is generated from the address, the command, the identifier and another check sum in a receiving bus subscriber;
comparing the check sum to the another check sum in the receiving bus subscriber to determine whether the sums match;

changing over to the reserve bus and applying for right to the reserve bus when the sums do not match;

comparing a received address to an address space of the receiving bus subscriber when the sums match to determine whether the received address lies within the address space of the receiving bus subscriber;

rejecting the received address when does not lie within the address space of the receiving bus subscriber and terminating the requested transaction; and generating and sending an acknowledgment signal by the receiving bus subscriber when the receiving address lies within the address space of the receiving bus subscriber and executing the requested transaction.

18. The method according to claim 17, wherein the requested transaction is a read request and further comprising:

reading data under the received address;

applying for a right to access the data bus by the receiving bus subscriber having a receiving address that has not been rejected;

granting the right to access the data bus to the applying receiving bus subscriber; outputting requested transaction data, a received identifier, and the another check sum by the receiving bus subscriber;

comparing the received identifier to the transmitted identifier transmitted by the transmitting bus subscriber to achieve a first comparison result;

rejecting the received data when the first comparison result is negative; forming a third check sum from the transaction data, the received identifier and the another check sum by the transmitting bus subscriber when the first comparison result is positive;

comparing the third check sum to the another check sum to achieve a second comparison result;

switching to the reserve bus and reapplying for a right to access the data bus by the receiving bus subscriber when the second comparison result is negative;

sending an acknowledgment signal and sorting the received data according to a transaction number that is in the received identifier when the second comparison result is positive; and using the received data by the transmitting bus subscribers.

19. The method according to claim 17, wherein the requested transaction is a write request and further comprising:

receiving the acknowledgment signal by the transmitting bus subscriber; checking the acknowledgment signal by the transmitting bus subscriber to determine whether the acknowledgment signal is a positive acknowledgment signal or a negative acknowledgment signal;

reapplying for the right to access the main address bus when the acknowledgment signal is determined to be a negative acknowledgment signal;

outputting a data job having data, a data check sum and a second identifier to the data bus, wherein the second identifier of the data job corresponds to the identifier of the address job;

comparing the second identifier to the identifier of the address job in the receiving bus subscriber to achieve a comparison result;

rejecting the received data job and ending the transaction process when the comparison result is negative;

forming a third check sum from the received data, the data check sum and the identifier in the receiving bus subscriber;

comparing the third check sum to the data check sum to achieve a second comparison result;

switching to the reserve bus when the second comparison result is negative and outputting the data job again by the transmitting bus subscriber; and delivering a positive acknowledgment signal when the second comparison result is positive and writing data in the receiving bus subscriber.

* * * * *